E. HOPKINSON.
METHOD OF MAKING PNEUMATIC TIRE CASINGS.
APPLICATION FILED JUNE 10, 1919.

1,349,423. Patented Aug. 10, 1920.
2 SHEETS—SHEET 1.

Inventor
Ernest Hopkinson

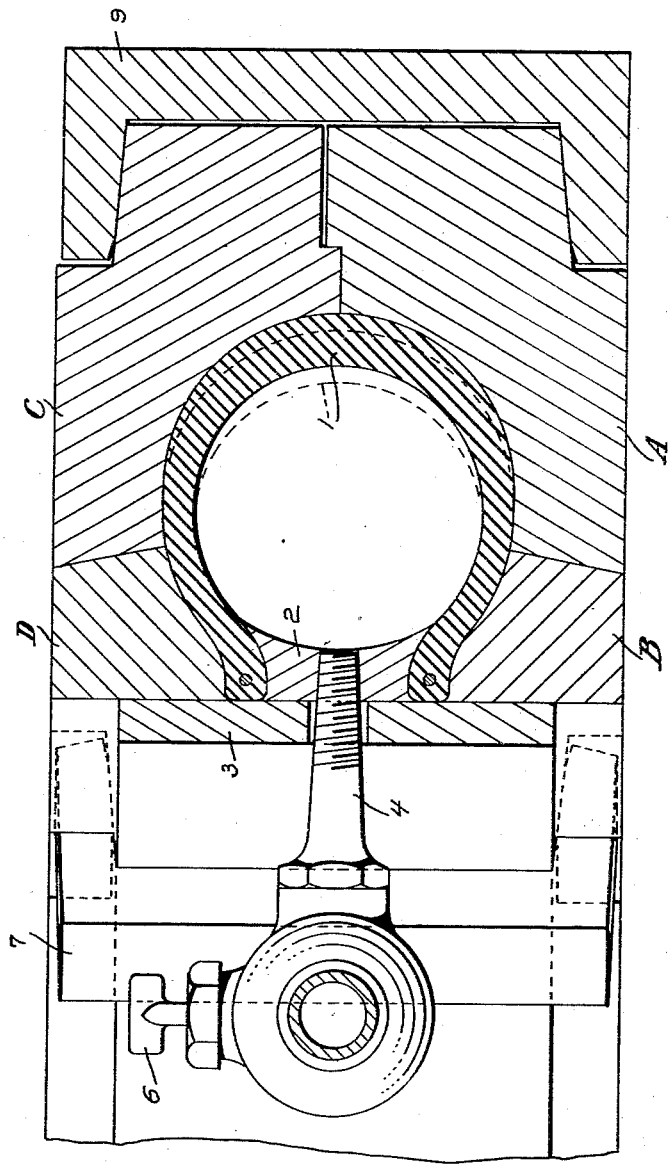

UNITED STATES PATENT OFFICE.

ERNEST HOPKINSON, OF NEW YORK, N. Y.

METHOD OF MAKING PNEUMATIC-TIRE CASINGS.

1,349,423.   Specification of Letters Patent.   Patented Aug. 10, 1920.

Application filed June 10, 1919. Serial No. 303,136.

*To all whom it may concern:*

Be it known that I, ERNEST HOPKINSON, a citizen of the United States, residing at New York, in the county of New York and State of New York, have invented a certain new and useful Method of Making Pneumatic-Tire Casings, of which the following is a full, clear, and exact description.

This invention relates to a method of making pneumatic tire casings wherein the casing is inclosed during vulcanization in outer confining walls and is supported interiorly by a mass of plastic material.

The primary object of my invention is to compact or stretch the laminated structure composing the casing against the outer confining walls by means of a plastic material which in addition to its stretching and compacting action on the casing is sufficiently yielding to respond to the pressure of the casing due to the expansion of the material composing same when subjected to the heat of vulcanization, and is sufficiently mobile to accommodate itself to the change in size or shape of the casing previous to and during the vulcanizing operation.

A further object of my invention is to stretch or distend a tire casing from a smaller size to its final size and shape within the outer mold walls by means of a plastic material under pressure.

A further object of my invention is to provide a plastic material which will not injuriously affect the casing when used in the above manner, and a plastic may be employed that will not be destroyed by the method, or that may be suitably treated afterward to render it capable of repeated use.

It will therefore be seen from the above that some of the advantages possessed by my invention are that the plastic material may be repeatedly and indefinitely used in the manufacture of casings on account of its indestructible nature, and therefore presents a great saving over solid cores which have a limited life, and especially over the expansible tubes and air bags commonly used which are rendered entirely useless by the heat of vulcanization after comparatively few casings have been cured on them.

The plastic material affords a somewhat yielding support, and therefore when outer rigid molds are employed, does not subject the fiber and fabric of the casing to the harsh crushing action as does a rigid metal core of the usual type when the casing is compressed between it and the equally rigid outer mold walls. The plastic material being under pressure compacts the wall of the casing against the outer mold walls thereby insuring a reproduction of the exact size and shape of the mold cavity and at the same time permits a free flow of the rubber and a readjustment of the threads composing the casing during the vulcanizing operation. Furthermore when the plastic material is employed to distend a casing to its final size all the cords will be straightened or stretched to the desired extent before the parts are permanently set by vulcanization.

The success of my method of distending the casing by employing a plastic material as an interior support during vulcanization is mainly due, first to the semi-solid nature of the plastic which maintains it sufficiently intact to prevent entrance of the material between the plies of the casing, which is one of the chief objections to the employment of liquids and gases under similar circumstances, and secondly, to its semi-liquid nature which permits of sufficient mobility to enable it to be readily forced into the cavity of the casing to fill every portion thereof. I have found that dry comminuted material does not possess this mobile property. It clogs the passage and presents such a high degree of frictional resistance that it cannot be used with success, whereas plastic material on account of its liquid content is of a slippery nature, and affords little or no frictional resistance but freely moves through the feeding apparatus and within the casing to fill the remotest parts thereof. I prefer, however, to have the liquid content of the plastic no greater than is necessary to produce these results and have found that a mixture of zinc oxid and water will produce a plastic well suited for this purpose.

In carrying out my invention a single casing may be filled with the plastic from a source of supply or a number of casings may be filled simultaneously from a common source of supply and this may be done either before or after the casings are inclosed in the outer molds and either before or after they are placed in the vulcanizing press, or the casings may be partly filled with the plastic material before the molds are placed in position or before the casings are placed in the vulcanizing press, for my invention does not require any such or other like limitations.

It is, however, necessary with the plastic material under pressure to confine the edges of the casing to prevent any objectionable outward movement, and I prefer to fill the casing with the plastic when the edges are in their normal positions and confined against outward movement.

While there are several ways of introducing the plastic to the casing I prefer to subject the casing to substantially all of the desired distending, stretching, and compacting action by a plastic material that is under a controllable pressure so that the pressure and quantity of material entering the casing may be varied as desired. After this has been accomplished I prefer to bring the plastic within the casing into communication with a source of plastic supply under a predetermined follow up pressure so that during the remainder of the treatment and during the vulcanizing process the intercommunication between the plastic in the casing and the plastic in the reserve supply chamber will permit the pressure and quantity of plastic in the casing to be maintained or increased as the cavity of the casing increases during the final shaping and curing of the casing.

The accompanying drawings illustrate an apparatus adapted for the carrying out of my method although it is obvious that many forms of apparatus may be used. Referring more particularly to the drawings in which similar reference characters indicate similar parts throughout:

Fig. 2 is an enlarged fragmentary sectional view taken on the line 2—2 Fig. 1 viewed in the direction of the arrow;

Figure 3:
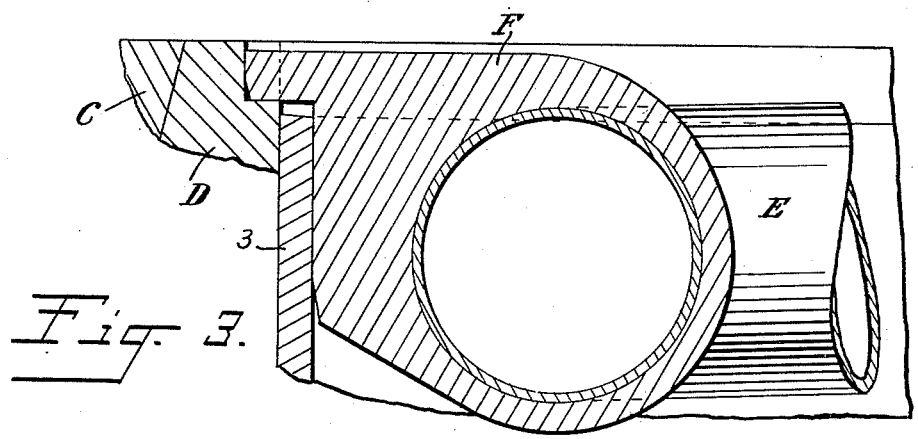
Fig. 3 is a fragmentary sectional view taken on a different plane than that of Fig. 2.
Figure 1:
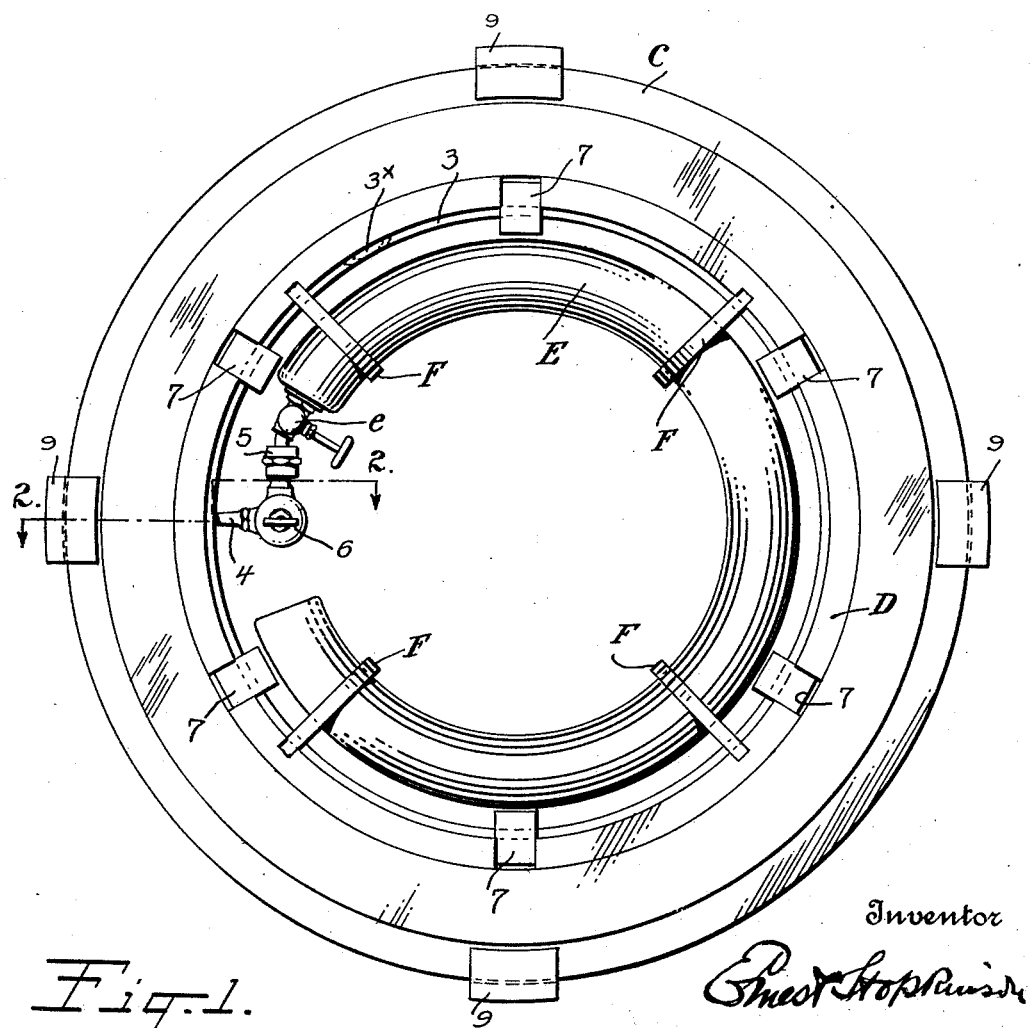
Figure 1 is a plan view of apparatus suitable for carrying out my method.

In the present instance rigid outer molds are shown for convenience, but the usual cloth wrappings or other outer confining means may be employed if desired. The casing 1, (see dotted lines Fig. 2) is represented of smaller size than the cavity of the mold, which in the present instance is composed of the four sections, B, D, secured together by the clamps 7, and A, C secured together by the clamps 9. It is to be understood that the casing shown is intended to represent any type of casing. It is mounted on a bull-ring formed of the inner ring 2 and the outer ring 3, the latter being open and provided with a wedge shaped key 3ˣ which may be forced in the opening to slightly expand the ring to produce a tight fit with the ring 2 and mold sections B, D. It is obvious, however, that the bull-ring if desired could be formed as a single piece.

Communication to the interior of the casing is provided by means of the pipe 4 tapped into the bull-ring, and the valve 6 provided with a threaded nipple which provides for a ready connection with a source of supply of plastic material which may be maintained under pressure in any desired manner, and which it is not thought necessary to show in the present instance. A reserve supply chamber E for the plastic in the form of a broken ring is detachably supported within the circumference of the casing by means of the brackets F which rest upon the mold in the manner shown to provide for their easy removal therefrom. The supply chamber is provided at one end with a pipe fitting containing a valve $e$ carrying a coupling 5 for connection with the nipple on valve 6.

In the practice of my invention, when the apparatus here shown is employed, the casing is mounted on the ring 2 and the sections B, D of the mold are placed in position. The ring 3 being in its centralized position within ring 2 the wedge shaped key 3ˣ is forced into the opening therein thereby expanding the ring against the member 2 and against the mold sections B and D, if desired, and at the same time accurately defining the interior diameter of the casing. The clamps 7 are then applied thereby firmly holding the edges of the casing against outward movement. The other mold sections A and C are then placed in position and their retaining clamps 9 applied.

The piping 4 having been secured in the bull-ring, is connected by means of the coupling 5 with a source of plastic supply, and the plastic therefrom is forced into the cavity of the casing with the desired degree of pressure until it entirely fills the cavity.

My invention contemplates supplying the plastic from a source which may be under a predetermined pressure, or under a controllable pressure which may be varied as desired. In either instance the pressure of the plastic results in compacting the casing against the mold walls, and, where the casing is of smaller size than the cavity of the mold walls it further results in distending or stretching it to its final size and compacting it against the mold walls. The entire operation may be accomplished at this time, including the formation of the tread and other surface configurations if there be any, if desired. I prefer, however, after substantially all of the stretching has been performed in this manner to close the valve 6 and disconnect the apparatus from the supply source and to connect it with the source of supply in the receiver E which is under a predetermined follow up pressure. The valves *e* and 6 are then opened, the mold is placed in the vulcanizer, and the casing vulcanized, any further stretching or reshaping of the casing during this period requiring a change in the pressure of the plastic or quantity required being taken care of by the supply chamber E.

As other embodiments of this invention may be made without departing from the spirit thereof, it is to be understood that I do not intend to limit myself to the specific form of embodiment of the invention herein described.

Having thus described my invention what I claim and desire to protect by Letters Patent is:

1. A method of making pneumatic tire casings which comprises subjecting the interior thereof to the expanding action of plastic material under pressure, compacting the casing by exteriorly and positively limiting said expansion, and vulcanizing the casing while the same is supported interiorly by the plastic material.

2. A method of making pneumatic tire casings which comprises confining the edges thereof against outward movement, filling the interior of the casing with a plastic material under pressure to expand it, compacting the casing and imparting a predetermined outer configuration thereto by positively exteriorly limiting such expansion at all points, and vulcanizing the casing while the same is supported interiorly by the plastic material.

3. A method of making pneumatic tire casings which comprises subjecting the interior thereof to the action of a plastic material and thereafter subjecting the casing within outer confining means to a vulcanizing temperature simultaneously with the subjection of the casing interiorly to a filling of plastic material variable as to volume.

4. A method of making pneumatic tire casings which comprises subjecting the interior thereof to the action of a plastic material under a controllable pressure and thereafter subjecting the casing while inclosed in outer confining means to a vulcanizing temperature simultaneously with the subjection of the casing interiorly to a filling of plastic material variable as to volume.

5. The method of making pneumatic tire casings which comprises expanding and compacting the casing by a filling of plastic material under controllable pressure, vulcanizing, and during vulcanization varying the quantity of filling in the casing in accordance with any change in conditions due to the heat of vulcanization.

6. The method of making pneumatic tire casings which comprises expanding and compacting the casing by filling it with plastic material under controllable pressure while limiting such expansion by outer rigid confining means, vulcanizing, and maintaining the interior of the casing in communication with a source of plastic under substantially a predetermined pressure during vulcanization.

7. The method of making pneumatic tire casings which comprises expanding the casing by a filling of plastic material under controllable pressure, positively limiting the expansion at all exterior points to thereby compact the casing, vulcanizing, and during vulcanization varying under substantially a predetermined balanced pressure the quantity of filling in the casing in accordance with any changes in its capacity.

8. The method of making pneumatic tire casings which comprises subjecting the casing to the action of a filling of plastic material under controllable pressure, vulcanizing, and during vulcanization subjecting the casing to the action of a plastic filling maintained substantially under a predetermined follow up pressure.

Signed at New York, county of New York, and State of New York, this 9th day of June, 1919.

ERNEST HOPKINSON.